United States Patent [19]

Graf et al.

[11] 4,425,387

[45] Jan. 10, 1984

[54] METHOD FOR PREPARING SOLID OBJECTS

[75] Inventors: Werner Graf; Volker Frey, both of Burghausen; Hans-Gunter Röse, Langenhagen, all of Fed. Rep. of Germany

[73] Assignee: Wacker-Chemie GmbH, Munich, Fed. Rep. of Germany

[21] Appl. No.: 414,162

[22] Filed: Sep. 2, 1982

[30] Foreign Application Priority Data

Oct. 26, 1981 [DE] Fed. Rep. of Germany ....... 3142419

[51] Int. Cl.³ .............................................. A21D 4/00
[52] U.S. Cl. ..................................... 427/341; 428/447; 427/387; 264/83; 264/236; 264/347; 528/17; 528/18; 528/25; 528/30; 524/440; 524/783; 525/474

[58] Field of Search ......................... 264/236, 83, 347; 528/25, 30, 17, 18; 525/474; 427/387; 524/440, 783; 428/447

[56] References Cited

U.S. PATENT DOCUMENTS 3,392,036 7/1968 McLeod .............................. 106/1.12
3,422,027 1/1969 Domba ................................ 524/588

Primary Examiner—Melvyn I. Marquis

[57] ABSTRACT

A process for preparing a solid object which comprises molding a composition obtained from the reaction of polysiloxanes having at least 3 silicon atoms per molecule and containing SiOC-bonded organic radicals and optionally, SiC-bonded organic radicals, with boric acid anhydride, and thereafter exposing the molded object to moisture.

10 Claims, No Drawings

METHOD FOR PREPARING SOLID OBJECTS

The present invention relates to a method for preparing solid objects and particularly to a method for molding solid objects from the products obtained from the reaction of an organosilicon compound and a boron compound. Also, the present invention relates to a method for coating substrates with a product obtained from the reaction of an organosilicon compound and a boron compound.

BACKGROUND OF THE INVENTION

Coatings, as well as solid objects, such as molded objects have been prepared from binder compositions containing the reaction product of organosilicon compounds and boron compounds. These compositions have been described in U.S. Pat. No. 3,392,036 to McLeod, in which an alkyl silicate is reacted with an alkyl borate in the presence of a solvent. The resultant binder composition may be combined with a finely divided solid inorganic material, such as zinc dust, and applied as a coating to a metal substrate.

In contrast to the binder composition described in U.S. Pat. No. 3,392,036, the reaction products of this invention have the advantage that they crosslink more rapidly after they have been formed into the desired shape. Furthermore, if the reaction products are fluid prior to crosslinking, they have the advantage over the reaction products known heretofore that they can be stored indefinitely in sealed containers.

U.S. Pat. No. 3,422,027 to Domba, describes a process for preparing reaction products which can be used in the process of this invention. However, the cited patent discloses that such products may be used for foam control and does not disclose that the product obtained from the reaction of an organosilicon compound and a boron compound may be used for molding solid objects.

Therefore, it is an object of the present invention to provide a process for preparing solid objects. Another object of the present invention is to provide a process for coating substrates. Still another object of the present invention is to provide a process for preparing solid objects from a composition containing a reaction product of an organosilicon compound and a boron compound. A further object of the present invention is to provide a process for coating a substrate with a composition containing a reaction product of an organosilicon compound and a boron compound. A still further object of the present invention is to provide a composition containing a reaction product obtained from an organosilicon compound and a boron compound which crosslinks in the presence of moisture, but may be stored indefinitely under anhydrous conditions.

SUMMARY OF THE INVENTION

The foregoing objects and others which will become apparent from the following description are accomplished in accordance with this invention, generally speaking, by providing a process for preparing solid objects which comprises forming a composition containing a product which is obtained from the reaction of polysiloxanes having at least 3 silicon atoms per molecule and SiOC-bonded organic radicals and, optionally SiC-bonded organic radicals, with boric acid anhydride into the desired shape and thereafter exposing the shaped object to moisture.

DETAILED DESCRIPTION OF THE INVENTION

The polysiloxanes containing at least 3 silicon atoms per molecule as well as SiOC-bonded organic radicals and optionally SiC-bonded organic radicals, which are used in preparing the reaction products of this invention, preferably have units of the general formula:

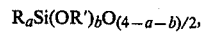

$$R_a Si(OR')_b O_{(4-a-b)/2},$$

in which R represents the same or different monovalent hydrocarbon radicals or substituted monovalent hydrocarbon radicals, R' represents the same or different aliphatic hydrocarbon radicals or hydrogen, with the proviso that no more than 5 percent by weight of Si-bonded hydroxyl groups are present, based on the weight of the polysiloxanes; a is 0, 1, 2 or 3; b is 0, 1, 2 or 3 and on the average 0.1 to 2.5, and the sum of a+b is on the average from 1 to 2.8.

It is preferred that the aliphatic hydrocarbon radicals represented by R', i.e., the SiOC-bonded organic radicals, contain from 1 to 6 carbon atoms per radical. Examples of suitable aliphatic hydrocarbon radicals represented by R' are alkyl radicals, such as the methyl, ethyl, n-propyl, and the isopropyl radical; as well as butyl, pentyl and hexyl radicals; cycloalkyl radicals such as the cyclohexyl radical and alkenyl radicals such as the allyl and the isopropenyl radical. Because of their availability, methyl and ethyl radicals are preferred examples of the R' radicals.

Also, it is preferred that the hydrocarbon radicals represented by R, i.e., SiC-bonded organic radicals, have from 1 to 10 carbon atoms per molecule. The examples cited for the hydrocarbon radicals represented by R' are equally applicable to the hydrocarbon radicals represented by R. Additional examples of hydrocarbon radicals represented by R are alkyl radicals having from 7 to 10 carbon atoms, such as heptyl and decyl radicals; the vinyl radical; aryl radicals such as the penyl radical and the xenyl radical; alkaryl radicals such as the tolyl radicals and aralkyl radicals such as the benzyl radical, as well as the beta-phenylethyl radical.

Examples of substituted hydrocarbon radicals represented by R are halogenated hydrocarbon radicals, such as the 3,3,3-trifluoropropyl radical and o-, m- and p-chlorophenyl radicals as well as radicals having the —COOC—groupings, such as the gamma-methacryloxypropyl radical.

Because they are readily available, it is preferred that at least 80 percent of the number of the SiC-bonded organic radicals be methyl radicals.

It is preferred that the polysiloxanes used in the preparation of the reaction products of this invention contain a maximum of 0.6 percent by weight of Si-bonded hydroxyl groups, based on the weight of the polysiloxanes. Even though U.S. Pat. No. 3,442,027 provides that polyethyl silicates containing at least 2 percent by weight of Si-bonded hydroxyl groups are preferred, we have found that the lower the percentage by weight of Si-bonded hydroxyl groups based on the weight of the polysiloxanes comprising SiOC-bonded and/or SiC-bonded organic radicals, the more rapid the reaction of the polysiloxanes with the boric acid anhydrides and the lower the temperature at which the reaction occurs. In order to decrease the percentage of Si-bonded hydroxyl groups based on the weight of the polysiloxanes, the polysiloxanes may be mixed, either prior to or simultaneously with or following the addition of the boric acid anhydride, with an agent which helps to decrease the percentage of Si-bonded hydroxyl groups and which decreases the percentage of Si-bonded hydroxyl groups more quickly than boric acid anhydride. Examples of such agents are titanium tetrabutylate and partial hydrolysates thereof, as well as organic tin compounds such as dibutyltin dilaurate. It is preferred that the agents used to decrease the percentage of Si-bonded hydroxyl groups be employed in amounts of from 0.5 to 5 percent by weight, based on the weight of the polysiloxanes.

In preparing the reaction products of this invention, boric acid anhydride ($B_2O_3$) is preferably used in an amount of from about 0.1 to 30 percent by weight, based on the weight of the polysiloxanes. If the reaction products used in accordance with this invention are in the liquid state, then boric acid anhydride is preferably used in an amount of at least 0.1 and, more preferably, in an amount of from 0.5 to 8 percent by weight, based on the weight of the polysiloxanes.

The reaction between the polysiloxanes containing at least 3 silicon atoms per molecule in addition to SiOC-bonded groups and optionally SiC-bonded organic radicals, and the boric acid anhydride is preferably conducted at temperatures of from about 0° and up to about 150° C. and, more preferably between 15° and 70° C. Subsequent heating to 200° C. and the utilization of pyrogenically produced silicon dioxide, such as described in U.S. Pat. No. 3,422,027, is by no means necessary. Likewise, the alkanol does not need to be distilled off, such as described in U.S. Pat. No. 3,422,027, when the hydroxyl groups in the polysiloxanes do not exceed about 0.6 percent by weight based on the weight of the polysiloxanes, because at that rate, the reaction does not result in the formation of detectable amounts of alkanol.

The reaction of the polysiloxanes containing at least 3 silicon atoms per molecule in addition to SiOC-bonded groups and optionally, SiC-bonded organic radicals with the boric acid anhydride, is preferably conducted at atmospheric pressure, i.e., at 1013 mbar (abs.) or at approximately 1013 mbar (abs.) However, if desired, higher or lower pressures may be used as well.

It is preferred that the reactants be substantially free of water and alkanol during the preparation of the reaction products of this invention. However, it is not essential that only solvents, which are free of hydroxyl groups, such as toluene, be employed.

The reaction is terminated when all of the boric acid anhydride is dissolved, or when a solid has formed.

The mixture of reactants used in the preparation of the reaction products of this invention may contain fillers or pigments, such as sand, quartz meal, zinc dust or aluminum powder. When the reaction products are fluid, such fillers or pigments may be incorporated into the reaction products.

In forming solid structures from the reaction products of this invention, it is sufficient that they be placed in contact with an aqueous vapor such as is normally present in the air. However, if desired, additional aqueous steam may be applied.

The compositions obtained from the process of this invention may be used to prepare molds for metal casting or for the preparation of fireproof blocks.

Also, the compositions prepared in accordance with the process of this invention may be used for coatings, for example for coating metal substrates.

The compositions prepared in accordance with the process of this invention may also be used to fill cavities, such as sealing fissures in building materials.

In the following examples, all parts are by weight unless otherwise specified.

EXAMPLE 1

(a) About 100 parts of a commercially available polyethyl silicate having an $SiO_2$ content of 40 percent by weight (available as "TES 40" from Wacker-Chemie GmbH) and having units of the average formula:

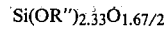
$Si(OR'')_{2.33}O_{1.67/2}$ in which $R''$ represents a sufficient number of hydrogen atoms to ensure that the proportion of Si-bonded hydroxyl groups is between 0.3 and 0.6 percent by weight, while the remainder of the $R''(s)$ consists of ethyl groups; are mixed with 5 parts of boric acid anhydride at room temperature until the boric acid anhydride is dissolved. The resulting liquid is then filtered. Nuclear magnetic resonance analysis and infrared spectroscopy show SiOB bonds, but neither boric acid nor boric acid anhydride is present in the filtrate.

(b) About 100 parts of the filtrate prepared in Example 1(a) above are mixed with 100 parts of xylene, 700 parts of zinc dust, 12 parts of pyrogenically produced silicon dioxide containing trimethylsiloxy groups and having a surface area of approximately 150 g/m², and 30 parts of finely ground talcum ("Microtalcum"). The resulting composition which is applied to a steel plate at a temperature of 25° C. and at 50 percent relative humidity, hardens within 3 hours, forming a thick coating which adheres very well and which is free of solvents. The same results are observed when the zinc composition has been stored for 2 weeks at 70° C. in a closed container, and then applied to steel plates. The storage period does not result in the formation of any jelled particles and the workability of the zinc composition is just as good as it was prior to storage.

EXAMPLE 2

(a) A mixture consisting of 100 parts of a polysiloxane having units of the average formula

$CH_3Si(OC_2H_5)_{0.6}O_{1.2}$ with a viscosity of 25 mm²·s⁻¹ at 20° C. and 4 parts of boric acid anhydride, is stirred at 70° C. until a slightly opaque solution has formed. After the mixture has been filtered, the viscosity of the resulting reaction product is 60 mm²·s⁻¹.

(b) About 100 parts of the reaction product prepared in Example 2(a) above are mixed with 100 parts of a commercially available mixture of xylene isomers. The resultant solution is applied to an aluminum plate and heated at 25° C. for 24 hours.

A solid, solvent-free coating is formed which adheres to the aluminum plate.

EXAMPLE 3

About 100 parts of the polysiloxane described in Example 2(a) above are mixed at room temperature with 25 parts boric acid anhydride. Within 20 minutes the mixture forms a gel, which when exposed to atmospheric moisture, solidifies into a hard structure within a few hours.

EXAMPLE 4

A mixture containing 100 parts of polyethyl silicate having units of the average formula $$Si(OR^1)_{2.2}O_{1.8/2}$$

in which a sufficient number of the $R^1(s)$ represent hydrogen atoms, to ensure that the proportion of Si-bonded hydroxyl groups is approximately 0.8 percent by weight, while the remainder of the $R^1(s)$ consist of ethyl groups, 3 parts of titanium butylate and 3 parts of boric acid anhydride, is stirred at 20° C. until the boric acid anhydride is dissolved. The resultant reaction product is then mixed with 400 parts of zinc powder. The resultant zinc composition is then sprayed onto a previously sandblasted iron substrate. The coating composition hardens within 3 hours, to form a solvent-free coating.

What is claimed is:

1. A process for preparing a coating composition which comprises reacting in an essentially water-free medium, a polysiloxane containing SiOC-bonded monovalent hydrocarbon radicals having from 1 to 6 carbon atoms and having at least 3 silicon atoms per molecule and up to 0.6 weight percent of Si-bonded hydroxyl groups based on the weight of the polysiloxane with boric acid anhydride in the presence of a compound selected from the group consisting of an organic tin compound, titanium tetrabutylate and partial hydrolyzates thereof at a temperature of from 0° to 150° C.

2. The process of claim 1, wherein the polysiloxane contains SiC-bonded organic radicals.

3. The process of claim 1, wherein the polysiloxane consists of units of the general formula $$R_aSi(OR')_bO_{(4-a-b)/2}$$

in which R is selected from the group consisting of monovalent hydrocarbon radicals and substituted monovalent hydrocarbon radicals, R' is selected from the group consisting of aliphatic hydrocarbon radicals and hydrogen, with the proviso that Si-bonded hydroxyl groups are not present in an amount greater than 5 weight percent, based in the weight of the polysiloxane; a is 0, 1, 2 or 3; b is 0, 1, 2 or 3 and on the average from 0.1 to 2.5; and the sum of a+b is on the average from 1 to 2.8.

4. The process of claim 1, wherein the boric acid anhydride is present in an amount of from 0.1 to 30 weight percent, based on the weight of the polysiloxane.

5. The process of claim 4, wherein the boric acid anhydride is present in an amount of from 0.5 to 8 weight percent, based on the weight of the polysiloxane.

6. A process for coating a substrate which comprises applying the composition of claim 1 to a substrate and thereafter exposing the coated substrate to moisture.

7. The process of claim 6, wherein the substrate is a metal substrate.

8. The process of claim 1, wherein the reaction is conducted in the presence of an organic solvent free of water.

9. A coating composition prepared in accordance with the process of claim 1.

10. The coating composition of claim 9 which contains zinc dust.

* * * * *